(12) United States Patent

Ikeda et al.

(10) Patent No.: US 6,172,771 B1
(45) Date of Patent: Jan. 9, 2001

(54) IMAGE FORMING SYSTEM AND CALIBRATION METHOD FOR IMAGE FORMING CONDITIONS

(75) Inventors: Yuichi Ikeda, Numazu; Nobuatsu Sasanuma, Mishima; Tetsuya Atsumi, Susono; Yasuhiro Saito, Shizuoka-ken, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 09/062,505

(22) Filed: Apr. 20, 1998

(30) Foreign Application Priority Data

Apr. 22, 1997 (JP) .................................................. 9-104261

(51) Int. Cl.⁷ ...................................................... H04N 1/00
(52) U.S. Cl. ........................... 358/406; 358/1.1; 358/504; 399/39; 399/72
(58) Field of Search ..................................... 358/406, 504, 358/518, 519, 1.15, 448, 1.1, 1.4; 399/72, 140, 39, 53, 54, 55, 59, 65

(56) References Cited

U.S. PATENT DOCUMENTS

| 5,258,783 | | 11/1993 | Sasanuma et al. .................... 346/157 |
| 5,414,531 | | 5/1995 | Amemiya et al. .................... 358/465 |
| 5,434,645 | | 7/1995 | Usami .................................... 355/38 |
| 5,489,998 | | 2/1996 | Yamada et al. ....................... 358/523 |
| 5,566,372 | * | 10/1996 | Ikeda et al. .......................... 355/208 |
| 5,572,330 | | 11/1996 | Sasanuma ............................ 358/298 |
| 5,583,644 | * | 12/1996 | Sasanuma et al. .................... 358/296 |
| 5,608,549 | | 3/1997 | Usami .................................. 358/530 |
| 5,697,012 | | 12/1997 | Sasanuma et al. ..................... 399/49 |
| 5,760,913 | * | 6/1998 | Falk ..................................... 358/298 |
| 5,933,676 | * | 8/1999 | Ohno ....................................... 399/8 |

FOREIGN PATENT DOCUMENTS 7-298075    11/1995   (JP) ................................ H04N/1/52

* cited by examiner

Primary Examiner—Edward L. Coles
Assistant Examiner—Mark Wallerson
(74) Attorney, Agent, or Firm—Fitzpatrick, Cella, Harper & Scinto

(57) ABSTRACT

A system which utilizes plural image forming apparatus, equalizes gradation characteristics of images commonly output from such plural image forming apparatus. When the system includes three color copying apparatus, at first a test pattern image based on data from a pattern generator is output from the color copying apparatus. The prepared image is read by the reader of the color copying apparatus, and, based on the read data, the correction data of a table (LUT) are calibrated for obtaining density data for a laser beam. The calibration of the correction data of the color copying apparatus are conducted in a similar manner using, however, the reader of the same copying apparatus for reading the test pattern. It is therefore, rendered possible to exclude the influence of the difference in the reader characteristics on the calibration, and to equalize the gradation characteristics when the copying apparatus are used as printers.

12 Claims, 16 Drawing Sheets

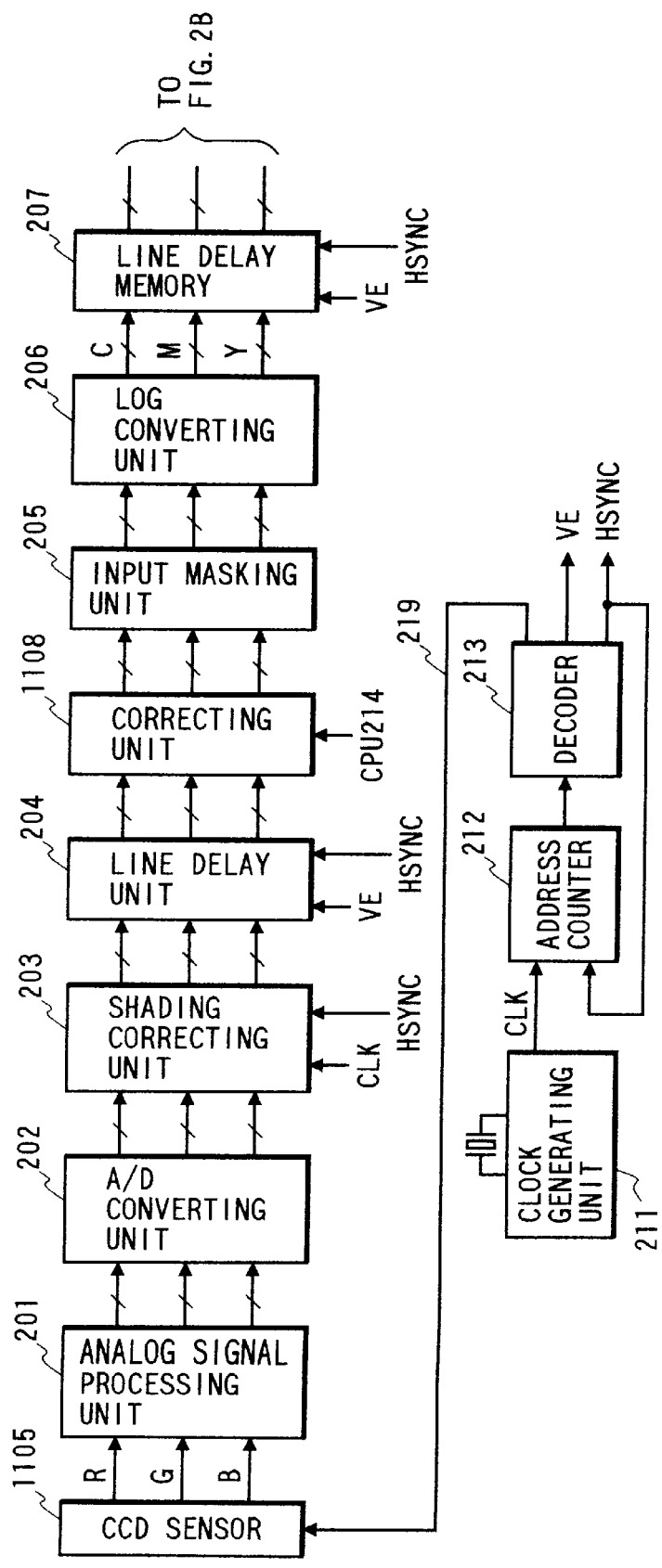

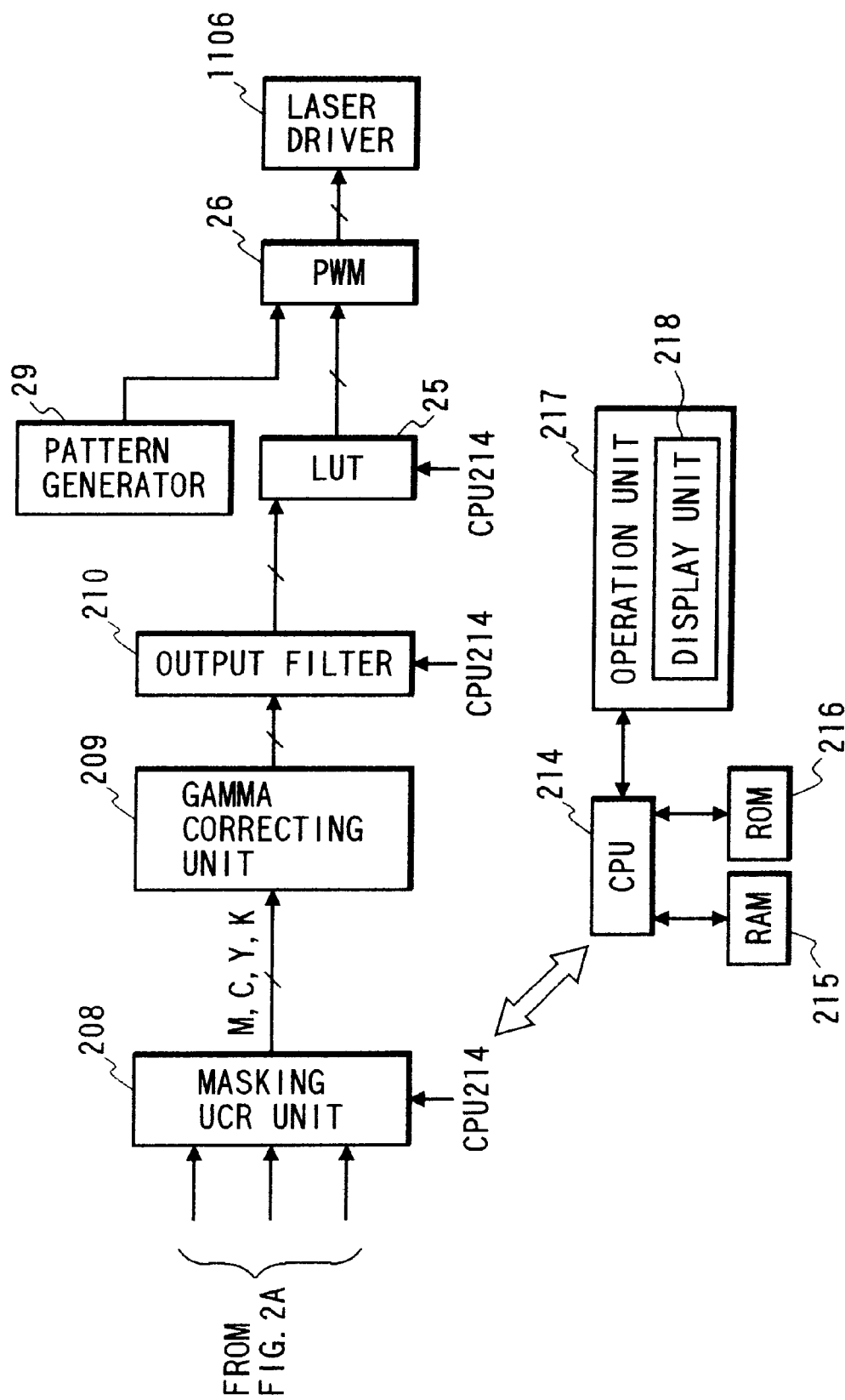

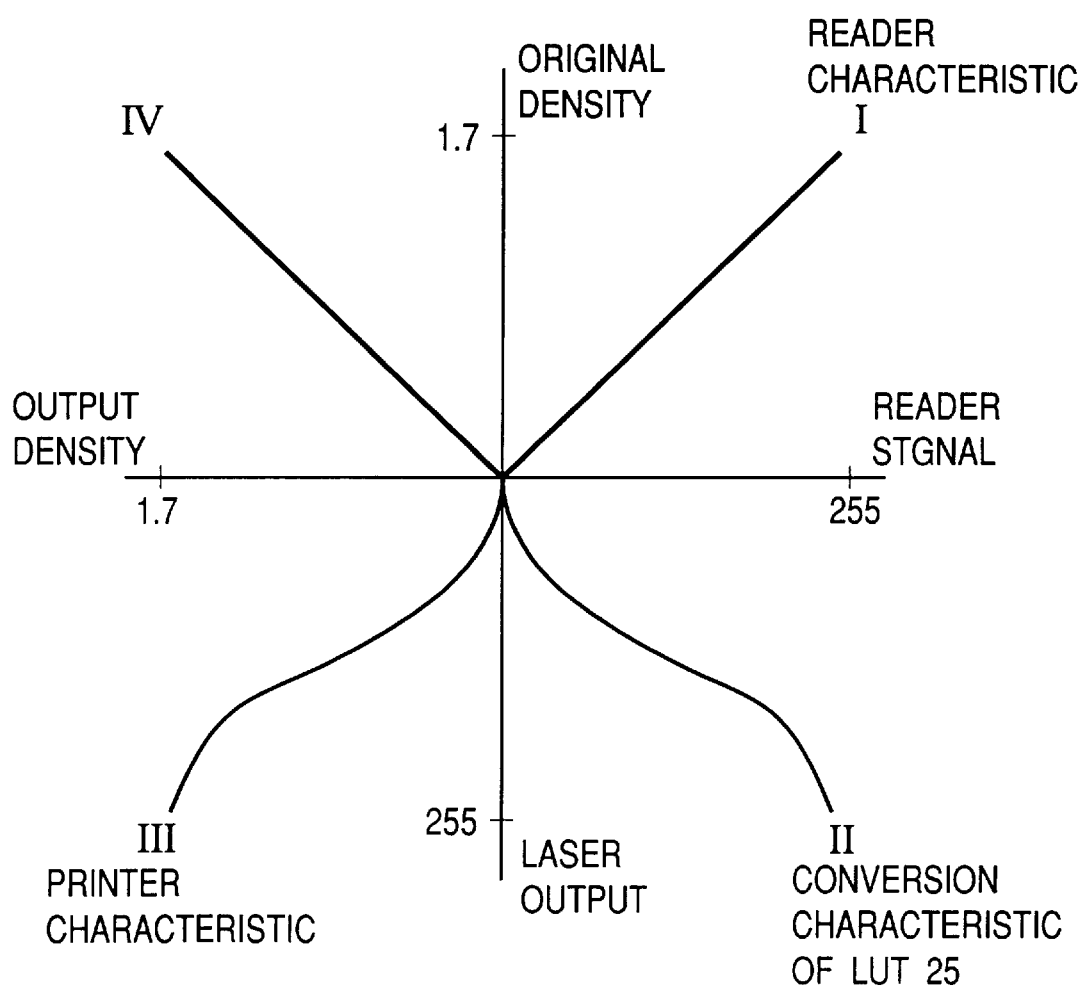

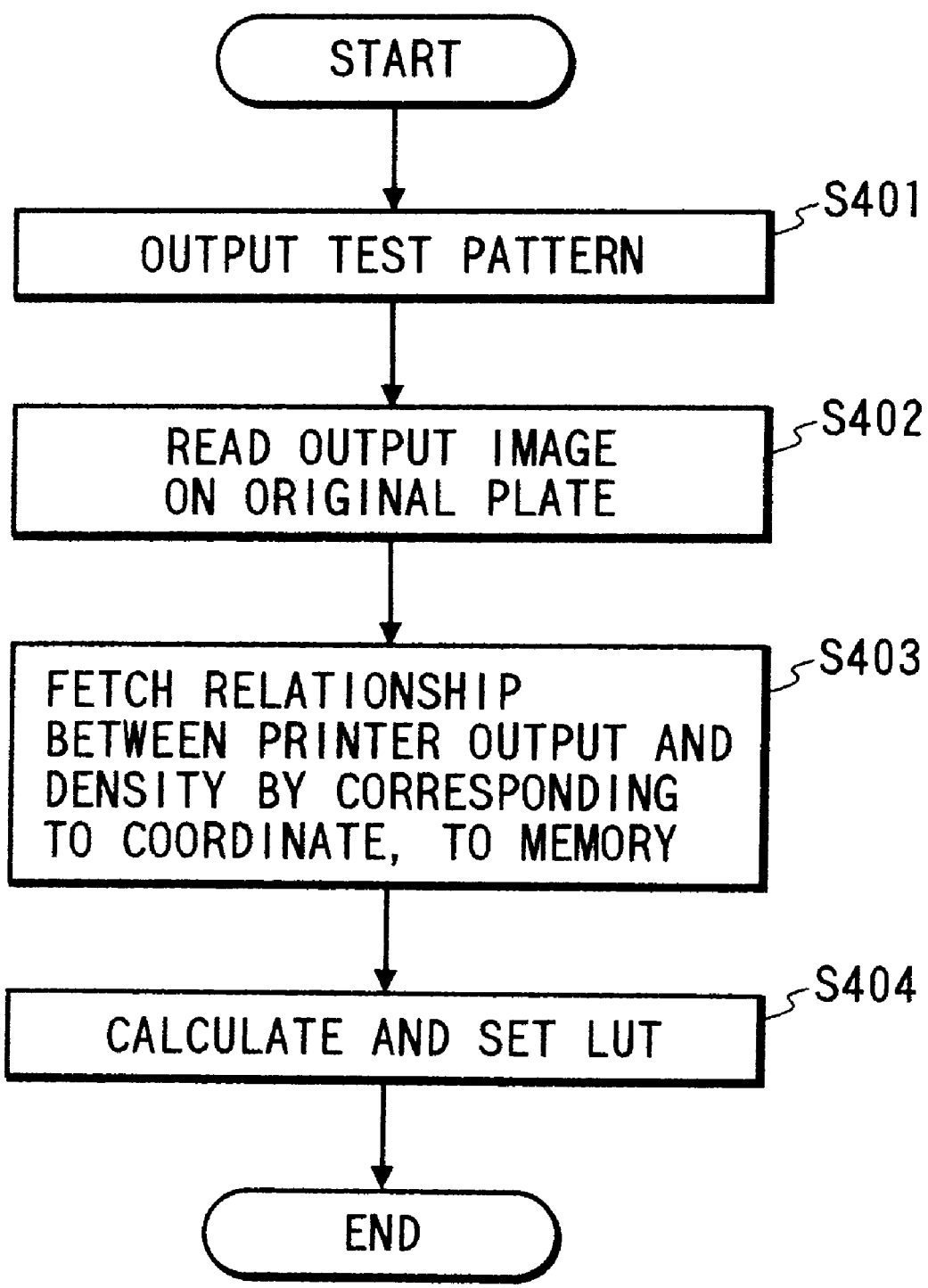

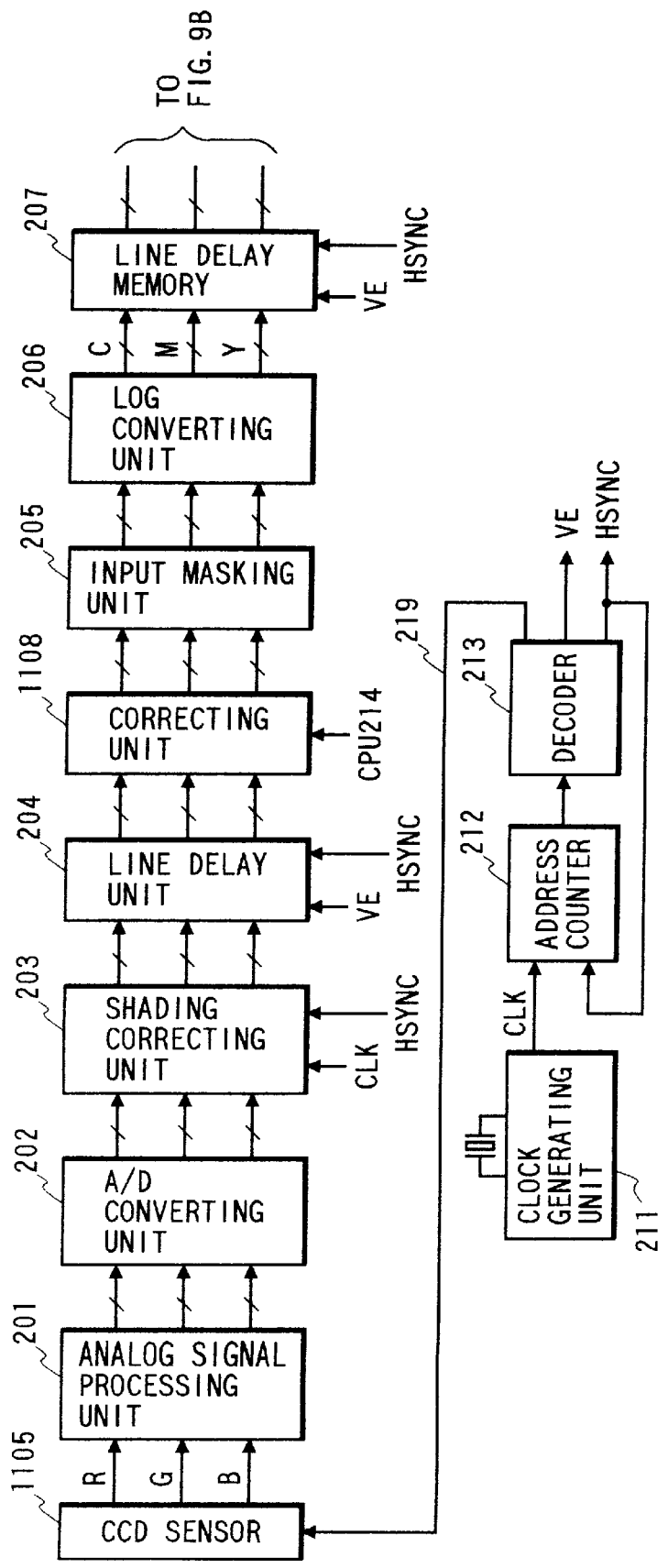

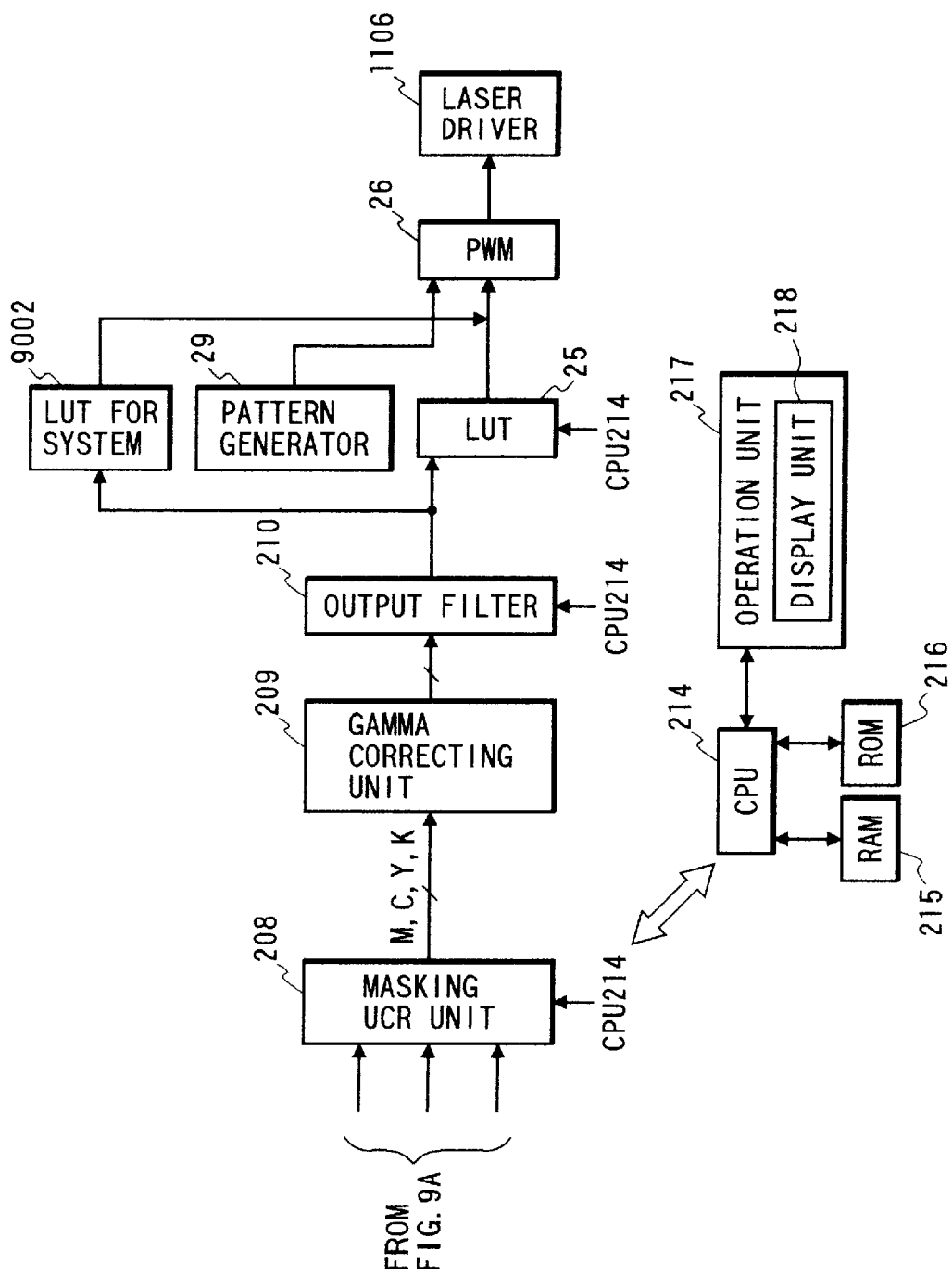

FIG. 14

```
┌─ GROUP 1 ─────────────────────────────┐
│                                        │
│  READER : COLOR COPYING MACHINE 1      │
│                                        │
│  COLOR COPYING MACHINE 1 :  YY  MM  DD │
│                                        │
│  COLOR COPYING MACHINE 2 :  YY  MM  DD │
│                                        │
│  COLOR COPYING MACHINE 3 :  YY  MM  DD │
└────────────────────────────────────────┘
```

IMAGE FORMING SYSTEM AND CALIBRATION METHOD FOR IMAGE FORMING CONDITIONS

BACKGROUND OF THE INVENTION

1. Field of the Invention

The present invention relates to an image forming system and a calibrating method for image forming conditions, and more particularly to an image forming system employing plural image forming apparatus in which the image forming conditions are determined according to the data read from a test pattern prepared in advance, and a calibrating method for image forming conditions for use therein.

2. Related Background Art

It is conventionally known to construct a system including plural units of image forming apparatus equipped with an image reader such as a color copying apparatus, thereby enabling to execute an ordinary copying operation in each copying apparatus and to output, by such copying apparatus, an image processed by a personal computer constituting an host equipment of the system. In such system, the different copying apparatus may output same images or may output respectively different images.

In such system, the calibration of the image forming conditions such as gradation correction, color correction, a gamma correcting table etc. with a test pattern has been executed by activating each image forming apparatus, preparing a particular pattern in each image forming apparatus, reading the density of such pattern by the respective image reader of such image forming apparatus and executing calibration of the image forming conditions such as gamma table of each image forming apparatus based on the result of such pattern reading. Such calibration is intended to improve the stability of the image quality.

In such conventional system, however, the images outputted from the respective image forming apparatus may be mutually different in the gradation characteristics etc. in case the image readers of such image forming apparatus have inherent fluctuations in the image reading characteristics or show such fluctuations by time-dependent changes. Such difference in the image reading characteristics of the reader does not constitute a major drawback in case each apparatus is individually used as the copying apparatus, but, in case the plural apparatus are utilized as printers, the commonly outputted images may be mutually different in gradation or in color.

SUMMARY OF THE INVENTION

In consideration of the foregoing, the object of the present invention is to provide an image forming system including plural image forming apparatus and enabling image forming in each of such image forming apparatus, the system being capable of comprehensively calibrating the image forming conditions of the respectively image forming apparatus and equalizing the gradation, color etc. of the images outputted therefrom, and a calibrating method for the image forming conditions adapted for use therein.

The above-mentioned object can be attained, according to the present invention, by an image forming system including plural image forming apparatus, comprising:

test image forming means for forming a test image in each of the plural image forming apparatus, on the basis of predetermined data;

reading means to be commonly used for reading the test image formed by the test image forming means, in each of the plural image forming apparatus; and calibrating means for calibrating an image forming condition of each of the image forming apparatus, on the basis of the above-mentioned predetermined data and image data of the test image read by the reading means and corresponding to such image forming apparatus.

Other objects of the present invention, and the features thereof, will become fully apparent from the following description to be taken in conjunction with the attached drawings and from the appended claims.

BRIEF DESCRIPTION OF THE DRAWINGS

FIG. 2 comprised of FIGS. 2A and 2B is a block diagram of an image processing circuit for processing the signal read by a CCD in the above-mentioned copying apparatus;

FIG. 3 is a four-quadrant chart showing the gradation reproducing characteristics of the above-mentioned copying apparatus;

FIG. 4 is a flow chart showing a calibrating sequence for the gradation correcting data in case the copying apparatus is to be used singly;

FIG. 9 comprised of FIGS. 9A and 9B is a block diagram of an image signal processing circuit in a third embodiment of the present invention;

FIG. 14 is a view showing a display on the host equipment based on the information of the printer driver.

DETAILED DESCRIPTION OF THE PREFERRED EMBODIMENTS

Now the present invention will be clarified in detail by embodiments thereof, with reference to the attached drawings.

Prior to the description of the image forming system constituting an embodiment of the present invention, there will be explained, with reference to FIGS. 1, 2A and 2B, 3 to 5, a copying apparatus employed in the above-mentioned system.

Figure 1:
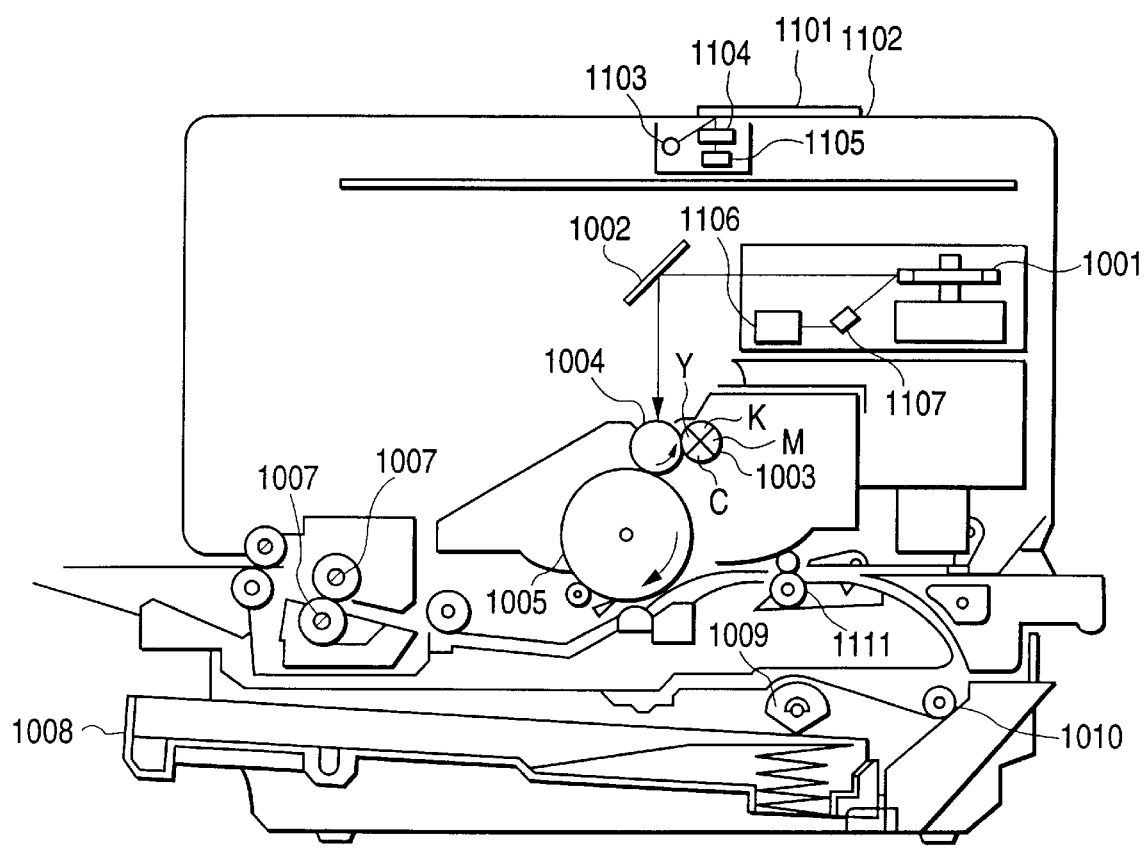
FIG. 1 is a schematic view of a copying apparatus constituting an embodiment of the present invention.

FIG. 1 is an external view of a copying apparatus adapted for use in the image forming system embodying the present invention.

An original 1101 is illuminated with a lamp 1103, and the light reflected from the original 1101 is guided through an optical system 1104 composed for example of lenses and is focused on a line image sensor 1105 composed, for example, of a CCD. An image reading unit, composed of the lamp 1103, optical system 1104, line image sensor (CCD sensor) 1105 etc., is moved in the sub-scanning direction by an unrepresented drive system, thereby reading the image of the entire original 1101.

An image signal outputted from the CCD sensor 1105 is subjected to signal processing to be explained later with reference to FIGS. 2A and 2B, and is converted into a laser beam by a laser driver 1106 and a laser light source 1107. The laser beam emitted from the laser light source 1107 is reflected in succession by a polygon mirror 1001 and a mirror 1002, and scans a photosensitive drum 1004. The photosensitive drum 1004 is rotated in a direction indicated by an arrow, and a latent image is formed on the surface thereof by the above-mentioned scanning with the laser beam. The latent image formed on the photosensitive drum 1004 is developed in each color component, by a rotary developing unit 1003. FIG. 1 shows a state in which the latent image is developed with yellow (Y) toner.

On the other hand, a recording sheet supplied from a sheet cassette 1008 by means of a sheet feeding cam 1009 and a sheet feeding roller 1010 is supplied, at a predetermined timing by registration rollers 1111, to a transfer drum 1005 and is wound thereon. Then, the toner images of respective colors are transferred in the order of Y (yellow), M (magenta), C (cyan) and K (black) in the successive turns of the transfer drum 1005, whereby the transfer of the toner images is completed by four turns in total of the transfer drum 1005.

The recording sheet bearing the transferred toner images thereon is peeled from the transfer drum 1005, and, after the fixation of the toner images by paired fixing rollers 1007 to complete a color image print, is discharged from the apparatus. The toner employed in the apparatus of the present embodiment is prepared by dispersing a coloring material of respective color in binder composed of styrenic resin.

FIGS. 2A and 2B are block diagrams showing the configuration of an image signal processing circuit in the above-explained copying apparatus.

Referring to FIGS. 2A and 2B, a CPU 214 controls the entire copying apparatus, including various processes to be explained in the following, according to a program stored in advance, for example, in a ROM 216. A RAM 215 is used as a work area for the CPU 214, while a ROM 216 stores the control programs and other data such as image processing parameters. An operation unit 217 includes a keyboard or a touch panel, and a display unit 218 such as an LCD unit, and serves to accept instructions of the operator and to transmit corresponding signals to the CPU 214, and also to display the operating conditions and status of the apparatus according to the instructions from the CPU 214.

An address counter 212 counts pixel clocks CLK generated by a clock generator 211 and outputs a main scanning address signal indicating the pixel address within a line. A decoder 213 decodes the main scanning address signal outputted from the address counter 212 and generates signals 219 such as a shift pulse and a reset pulse for driving the CCD sensor 1105 in the unit of each line, a signal VE indicating the effective area within the signals of a line outputted from the CCD sensor 1105, a line synchronization signal HSYNC etc. The address counter 212 is cleared by the signal HSYNC and initiates the counting of the main scanning address of a next line.

The image signals outputted, as explained in the foregoing with reference to FIG. 1, from the CCD sensor 1105 are subjected to the adjustment of gain and offset in an analog signal processing unit 201, then converted, in an A/D conversion unit 202, into color component signals such as R, G and B digital image signals of 8 bits each, and further subjected, in a shading correction unit 203, to known shading correction utilizing a signal obtained by reading a standard white board 1006.

A line delay unit 204 corrects the spatial aberration contained in the image signals released from the shading correcting unit 203. Such spatial aberration results from a fact that the line sensors constituting the CCD sensor 105 are arranged with a certain distance in the sub scanning direction. More specifically, the B color component signal is taken as the reference and the R and G color component signals are delayed in the sub scanning direction to synchronize the phases of the three color component signals.

A correction unit 1108 applies luminance correction to the image signals released from the line delay unit 204, as will be explained later in more detail.

An input masking unit 205 converts the color space of the image signals outputted from the correction unit 1108 into an NTSC standard color space by the matrix calculation indicated by the following equation (1):

$$\begin{bmatrix} R_o \\ G_o \\ B_o \end{bmatrix} = \begin{bmatrix} a11 & a12 & a13 \\ a21 & a22 & a23 \\ a31 & a32 & a33 \end{bmatrix} \begin{bmatrix} R_i \\ G_i \\ B_i \end{bmatrix} \quad (1)$$

wherein $R_o$, $G_o$, $B_o$: output image signals
$R_i$, $G_i$, $B_i$: input image signals.

A LOG conversion unit 206 consists of a look-up table, composed, for example, of a ROM, and converts the R, G, B luminance signals, outputted from the input masking unit 205, into C, M, Y density signals. A line delay memory unit 207 delays the image signals released from the LOG conversion unit 206 by a period required by an unrepresented black character discrimination unit to generate control signal UCR, FILTER, SEN etc. from the output of the input masking unit 205.

A masking/UCR unit 208 extracts a black component signal K from the image signals released from the line delay memory 207, and applies a matrix calculation, for correcting turbidity in colors of the coloring materials in a printer unit B, to the Y, M, C, K image signals, thereby releasing color component image signals, for example, of 8 bits each, in the order of M, C, Y and K for each reading operation of a reader unit A. The matrix coefficients employed in the matrix calculation are set by the CPU 214.

A gamma correction unit 209 serves to match the image signals with the ideal gradation characteristics of the printer unit B, by applying density correction to the image signals released from the masking/UCR unit 208. An output filter (spatial filtering unit) 210 applies edge enhancement or smoothing to the image signals released from the gamma correction unit 209.

A look-up table (LUT) 25 is used for matching the density of the output image with that of the original image as will be explained later, is composed, for example, of a RAM and contains a conversion table which is set by the CPU 214. A pattern generator 29 generates pattern data of a test print to be explained later. A pulse width modulator (PWM) 26 outputs a pulse signal of a pulse width corresponding to the level of the input image signal, and such pulse signal is supplied to the laser driver 1106 for driving the laser light source 1107.

FIG. 3 is a four-quadrant chart showing the signal converting characteristics of various parts of the copying apparatus, indicating the mode of reproduction of a gradation image in the copying apparatus of the present embodiment.

The first quadrant shows the characteristics of the reader for converting the density of the original into the density signal; the second quadrant indicates the conversion characteristics of the LUT 25 for converting the density signal into the laser output signal; the third quadrant indicates the characteristics of the printer for converting the laser output signal into the image output density; and the fourth quadrant shows the relationship between the original density and the output image density, indicating the entire gradation characteristics of the image forming apparatus. In the present embodiment, the gradation, being represented by an 8-bit digital signal, has 256 density levels. FIG. 3 shows a situation where the output image density faithfully reproduces the original image density. In order to obtain the relationship shown in the fourth quadrant, the conversions shown in the first to third quadrants have to be linear in the overall result, but, since the printer characteristics in the third quadrant are generally non-linear, such non-linearity is corrected by the conversion characteristics of the LUT 25 in the second quadrant. The correction data to be contained in the LUT 25 are determined by calculations to be explained later with reference to FIG. 4.

The density data converted by the LUT 25 are converted by the pulse width conversion circuit 26 into signals corresponding to dot widths, for supply to the laser driver 27. The present embodiment utilizes gradation reproducing means by such pulse width conversion. Thus, by the laser operation described in the foregoing, there is formed, on the photosensitive drum 1004, a latent image having gradation characteristics represented by the change in the dot area, and a gradation image is obtained through the steps of image development, transfer and fixation.

Figure 5:
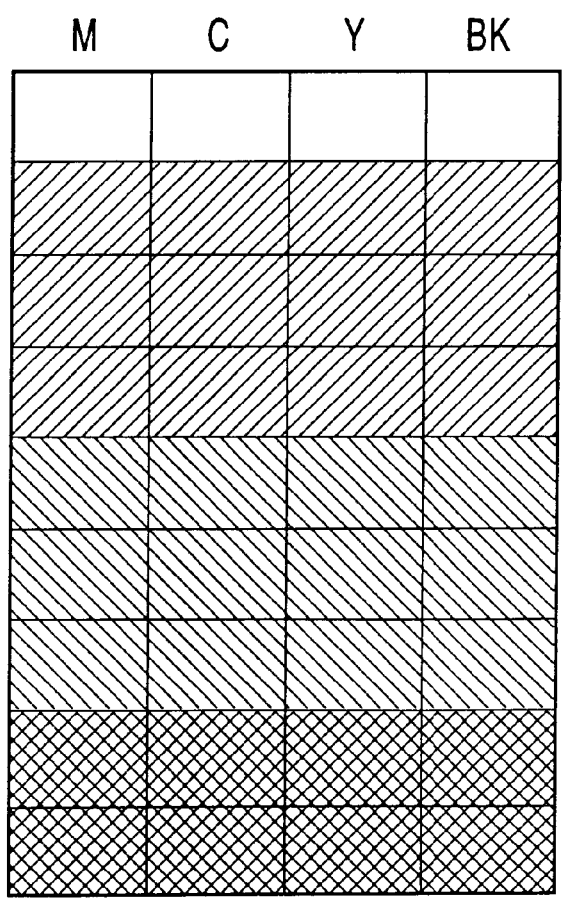
FIG. 5 is a schematic view of a test pattern image outputted in the calibration process for the gradation correcting data in an embodiment of the present invention.

FIG. 4 is a flow chart showing the sequence for determining the correction data of the above-described LUT 25. This sequence is initiated when the user, judging a mismatching in the gradation characteristics between the original image and the copied output image, actuates a calibrating key on the operation panel. In a step S401, the pattern generator 29 (cf. FIGS. 2A and 2B) outputs test pattern data to form a test pattern image on the recording material, for each of M, C, Y and K colors as shown in FIG. 5 (in FIG. 5, the number of gradation levels is represented fewer than in the actual image, for the purpose of simplicity of illustration).

Then, in a step S402, the thus printed sample is placed on the original table 1102 of the reader (cf. FIG. 1), and the test pattern image is read by the reader unit as described in relation to FIG. 1 and is converted, by the CCD 1105, into signals R, G, B representing the reflected light amount. The optical system utilizing the CCD is known to show satisfactory reproducibility in measurement, based on the shading correction. Then, in a step S403, the signals R, G, B from the CCD 1105 are finally converted into density data C, M, Y, K by a process explained in relation to FIGS. 2A and 2B. These density data are stored in the memory in correlation with the density data employed for the laser output for forming the output image, for each positional coordinate. Then in a step S404, based on the relationship between thus stored density data and the density data for the laser output, there are determined the correction data representing the inverse conversion of the printer characteristics explained in FIG. 3.

First Embodiment

Figure 6:
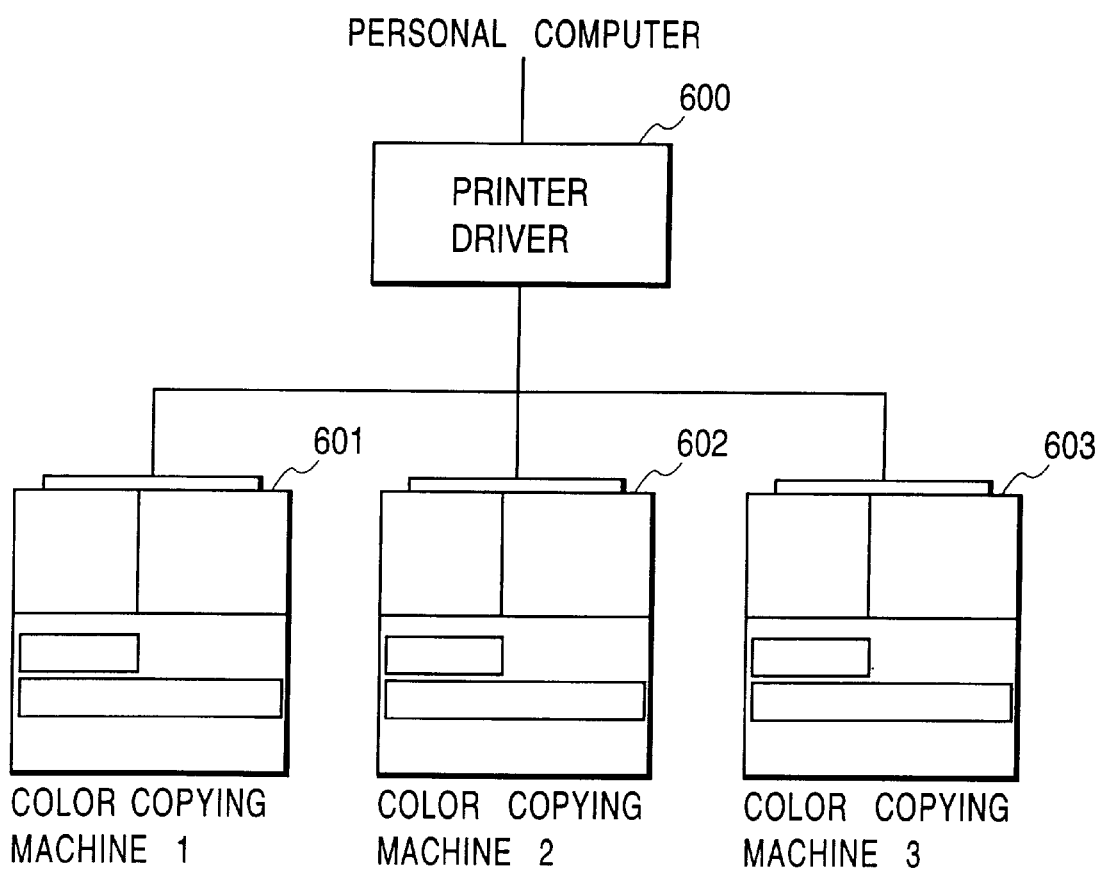
FIG. 6 is a block diagram of an image forming system constituting a first embodiment of the present invention.

FIG. 6 is a block diagram showing the configuration of an image forming system constituting an embodiment of the present invention.

In the system of the present embodiment, three color copying apparatus 601–603 are connected to a single printer driver 600. In the present system, the color copying apparatus 601–603 are not only connected to the printer driver 600 through a network but also are rendered capable of mutual communication. In the present system, in case a personal computer constituting the host equipment instructs, for example, 30 prints to the printer driver 600, and, if the three color copying apparatus 601–603 are operable, the printer driver 600 instructs 10 prints to each of the three color copying apparatus 601–603.

In such system, however, if the calibration of the image forming conditions such as the correction of the gradation or gamma characteristics is conducted independently in each color copying apparatus, the apparatus in the system may have mutually different gradation or gamma characteristics if their readers are mutually different in characteristics, whereby the output images from such apparatus may become mutually different in color or in density.

Such drawback can be avoided in the present embodiment by the configuration explained in the following. More specifically, as shown in FIG. 7, the reader of only one color copying apparatus is employed in determining the gradation correcting data of the LUT's of the three color copying apparatus.

Figure 7:
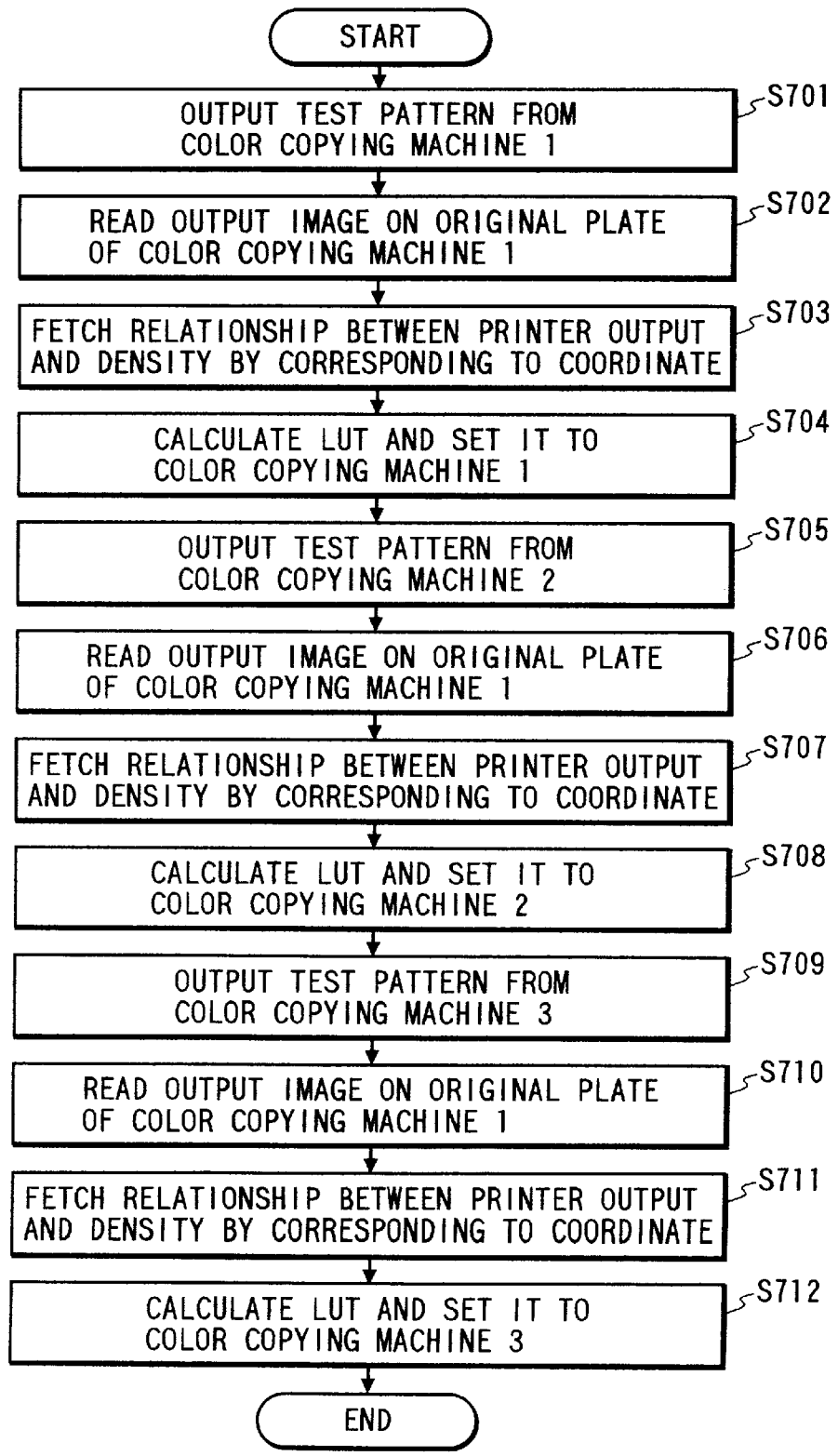
FIG. 7 is a flow chart showing the calibrating sequence for the correcting data in the above-mentioned first embodiment.

FIG. 7 shows a process, similar to that shown in FIG. 4, for determining the density correcting data of the LUT's of the copying apparatus 601–603. This sequence is activated by the actuation of a control switch, and, a step S701 causes the color copying apparatus 601 to print a test pattern image shown in FIG. 5. The printed image sample is read, in a step S702, by the reader of the first color copying apparatus 601. The correction data to be stored in the LUT are calculated from the read data, in a similar manner as explained in FIG. 4, and are stored in the LUT of the color copying apparatus 601 (steps S703, S704).

Then a test pattern image is similarly printed on the recording material by the second color copying apparatus 602 (step S705). The printed image is not read by the reader of the second color copying apparatus 602, but by the reader of the color copying apparatus 601 as in the step S702 (step S706), and, based on the read density, the correction data for the color copying apparatus 602 are determined and stored in the LUT therein (steps S707, S708). Furthermore, a test pattern image is similarly printed by the third color copying apparatus 603 and is read by the reader of the color copying apparatus 601 (steps S709, S710), and, based on the read density, the correction data for the color copying apparatus 603 are determined and stored in the LUT therein (steps S711, S712).

As explained in the foregoing, the gradation characteristic data of the three color copying apparatus 601–603 are determined according to the density data read by the reader of the color copying apparatus 601, and are therefore free from the difference resulting from the difference in the reading characteristics of the readers of the different color copying apparatus. Consequently, at least in case the color copying apparatus are used as printers for printing the image data supplied from the host equipment, the output images obtained from the different color copying apparatus, based on the same image data, become substantially equal in the gradation because of the density correction by the LUT's storing the respective correction data.

Second Embodiment

Figure 8:
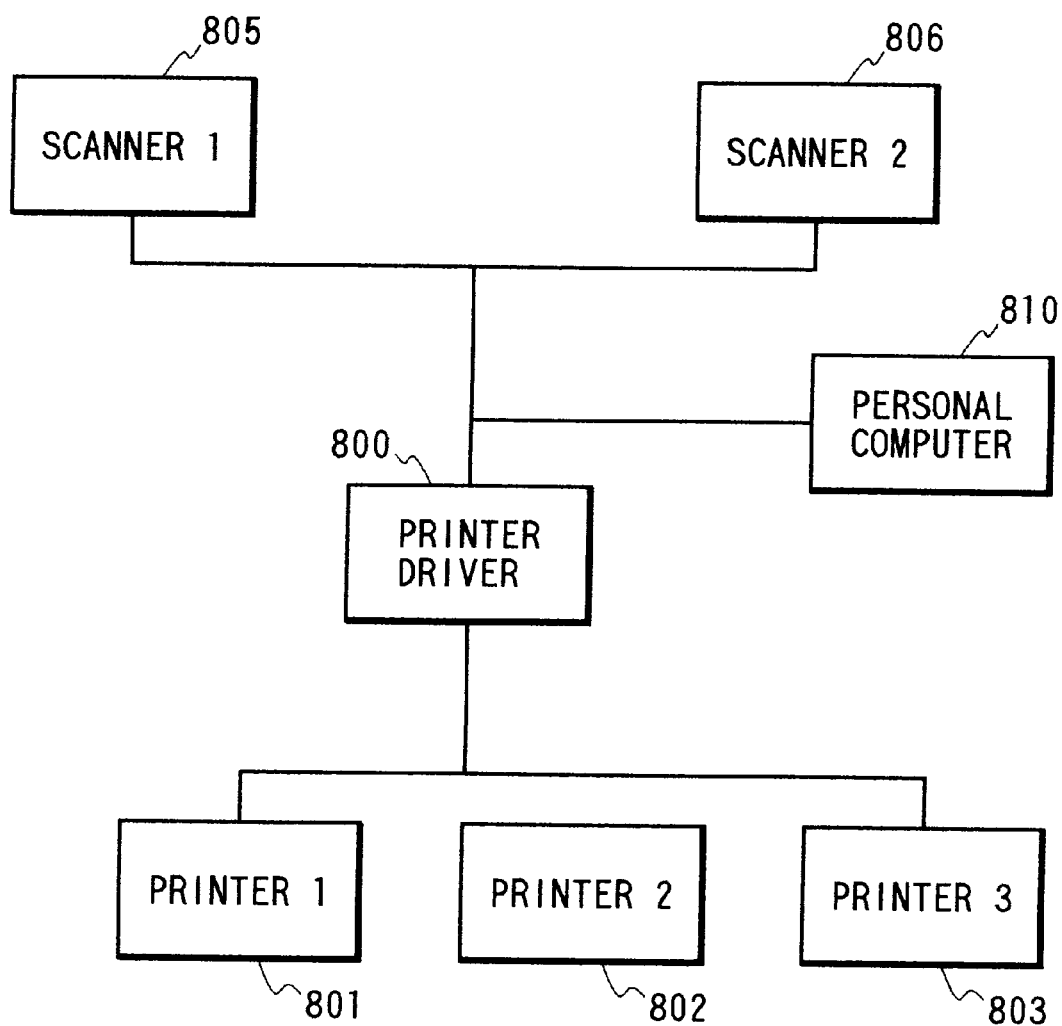
FIG. 8 is a block diagram of an image forming system constituting a second embodiment of the present invention.

FIG. 8 is a block diagram of an image forming system constituting a second embodiment of the present invention.

The present embodiment employs three color printers 801–803 and two color scanners 805, 806. Also in this embodiment, as in the first embodiment, a process for calibrating the correction data of the LUT is activated in case, for example, the gradation characteristics are different among the printers. At first the color printer 1 prints a test pattern image based on the data of the pattern generator, and the printed image is read by the scanner 805. Then, based on the read density, correction data are determined and stored in the LUT. Then the color printer 2 similarly prints a test pattern image, and the printed image is read by the same scanner 805, and, based on the obtained density data, the correction data are determined and stored in the LUT. Furthermore, a test pattern image is similarly printed by the color printer 3 and read by the scanner 805, and the LUT of the color printer 3 is set by the obtained density data.

Through the above-described process, the three color printers, being calibrated for the gradation correcting data utilizing a same scanner 805, provide the same gradation characteristics.

The foregoing second embodiment describes a system employing a combination of three color printers and two color scanners, but the same effects can also naturally be obtained in a system employing three color printers, a color copying apparatus and a color scanner, specifying a scanner (or the reader of the color copying apparatus) for the gradation correction.

Third Embodiment

In contrast to the foregoing first and second embodiments in which the LUT in the image forming apparatus is re-written, the present third embodiment provides the image forming apparatus with a LUT for use when the apparatus is operated in the stand-alone mode and a LUT to be used when the apparatus operated as a component of the system. In the first and second embodiments, the calibration of the gradation correcting data has to be executed in each of the three apparatus, and there is required another process as shown in FIG. 4 if the calibration for the gradation correcting data is required for the stand-alone mode, so that the additional process is indispensable. In the present embodiment, there are independently provided a LUT for the stand-alone mode and a LUT for the system mode, and the calibration of the correction data is completed in each apparatus by rewriting only the LUT for the stand-alone mode. The calibration for the correction data for the stand-alone mode is executed according to a procedure shown in FIG. 10, which is substantially the same as that shown in FIG. 4, while the calibration for the correction data for the system mode is executed according to a procedure shown in FIG. 11 which is substantially same as that shown in FIG. 7.

Figure 11:
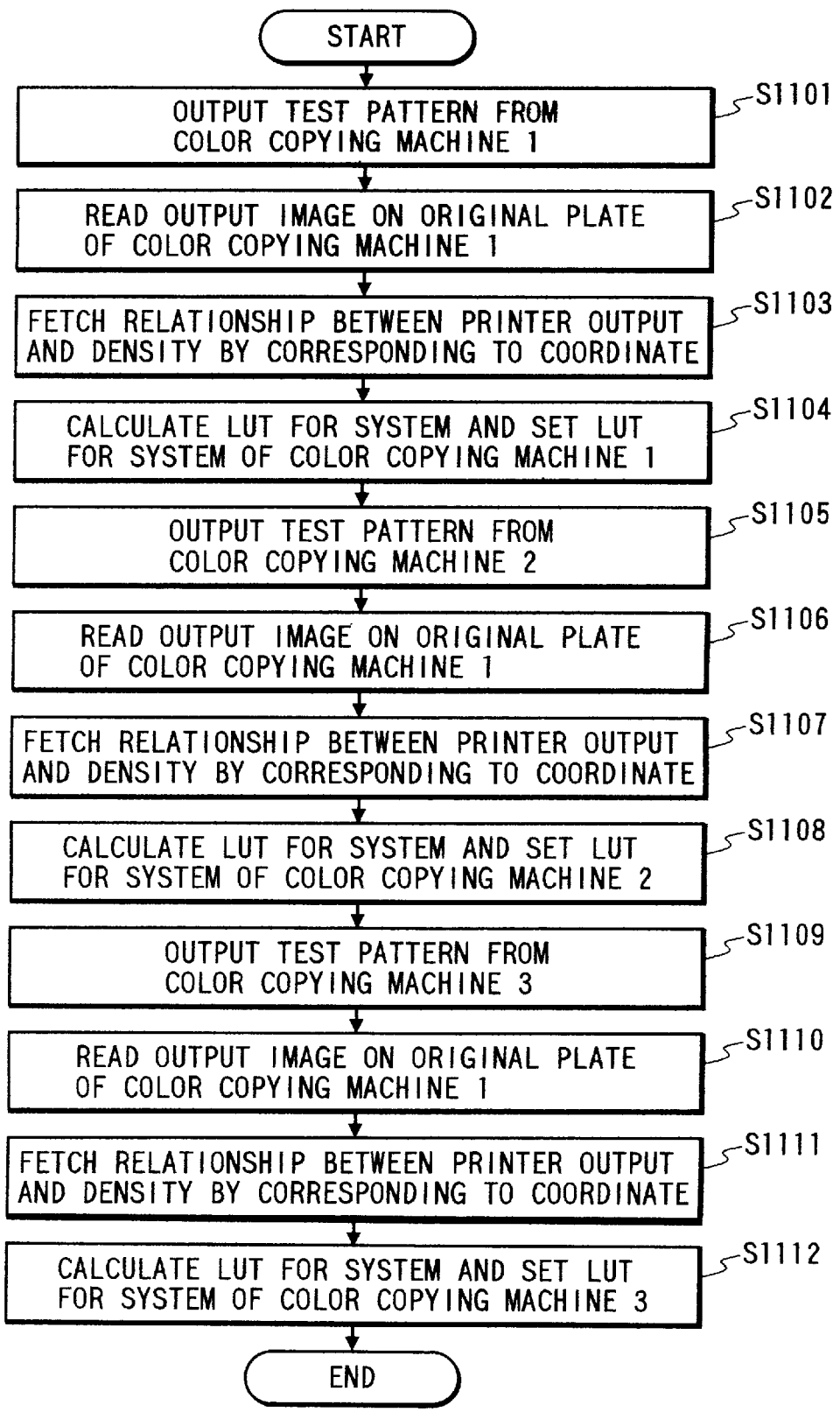
FIG. 11 is a flow chart showing the calibrating sequence for the gradation correcting data for the entire system in the above-mentioned third embodiment.

In the procedure shown in FIG. 11, the preparation of the correction data for the system mode is executed in succession for the plural color copying apparatus, but such preparation may also be executed at independent timing for each color copying apparatus.

FIGS. 9A and 9B show the configurations of the image processing of the present embodiment. As shown in FIG. 9B, the LUT 25 for the signals from the reader of the individual apparatus and the LUT 9002 in case the apparatus is used as a system printer are rendered switchable, and, the LUT for the system alone is re-written when the gradation correcting data for the system mode are calibrated, while the LUT for the individual apparatus alone is re-written when the gradation correcting data for the stand-alone mode are calibrated. Thus, it is rendered possible to output the optimum image both when the apparatus is used as a stand-alone equipment and when the apparatus is used as a part of the system, and the calibration of the gradation correcting data is facilitated.

In the present embodiment, the LUT for the system mode is incorporated in the individual equipment, but it may also be registered, together with the number of the equipment, in the printer driver.

Figure 10:
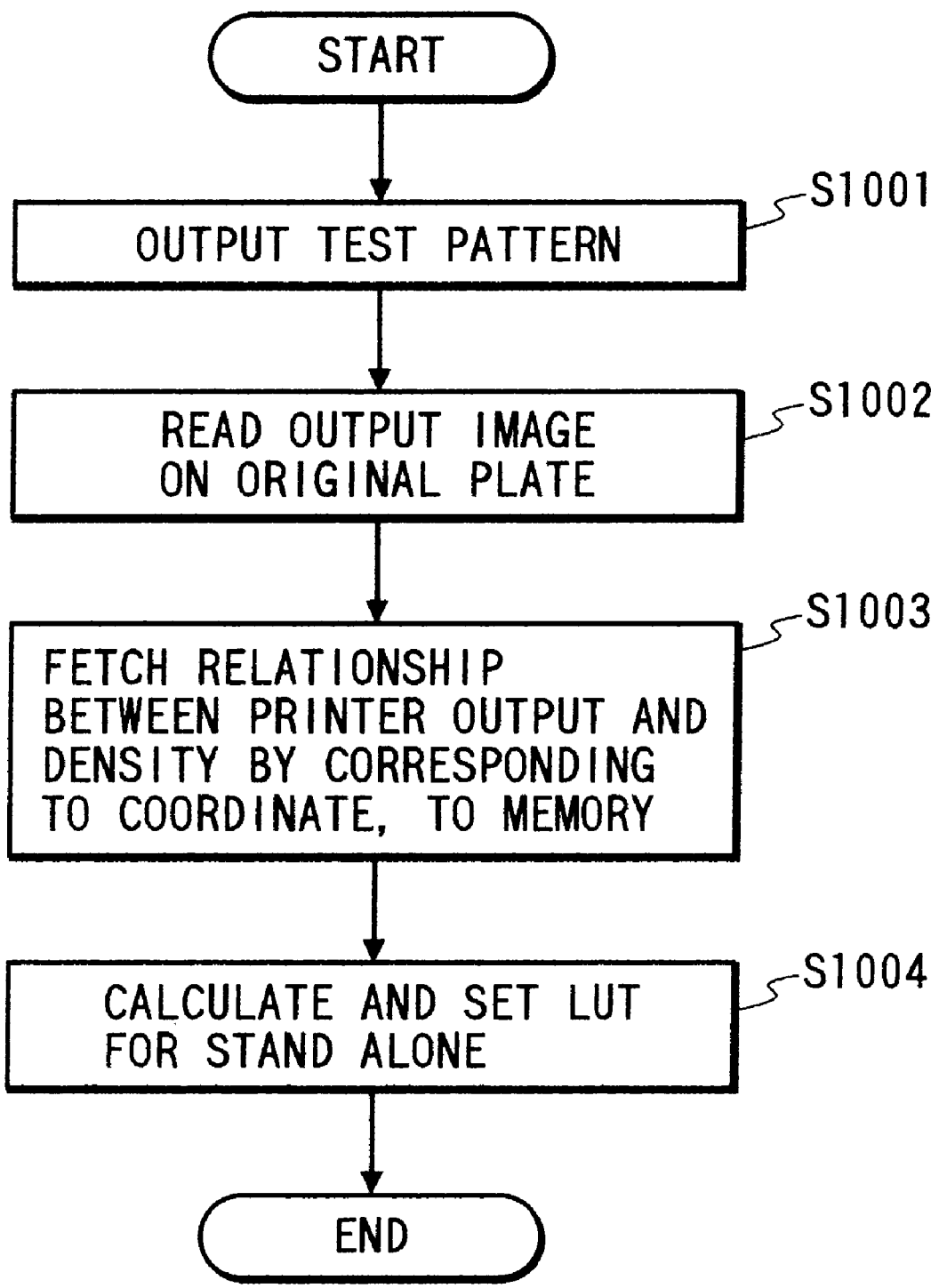
FIG. 10 is a flow chart showing the calibrating sequence for the gradation correcting data in case each apparatus is used in the stand alone mode in the above-mentioned third embodiment.

In the following there will be explained, with reference to FIGS. 12 and 13, the guidance display shown on the display unit of the color copying apparatus at the processes shown in FIGS. 10 and 11.

Figure 12:
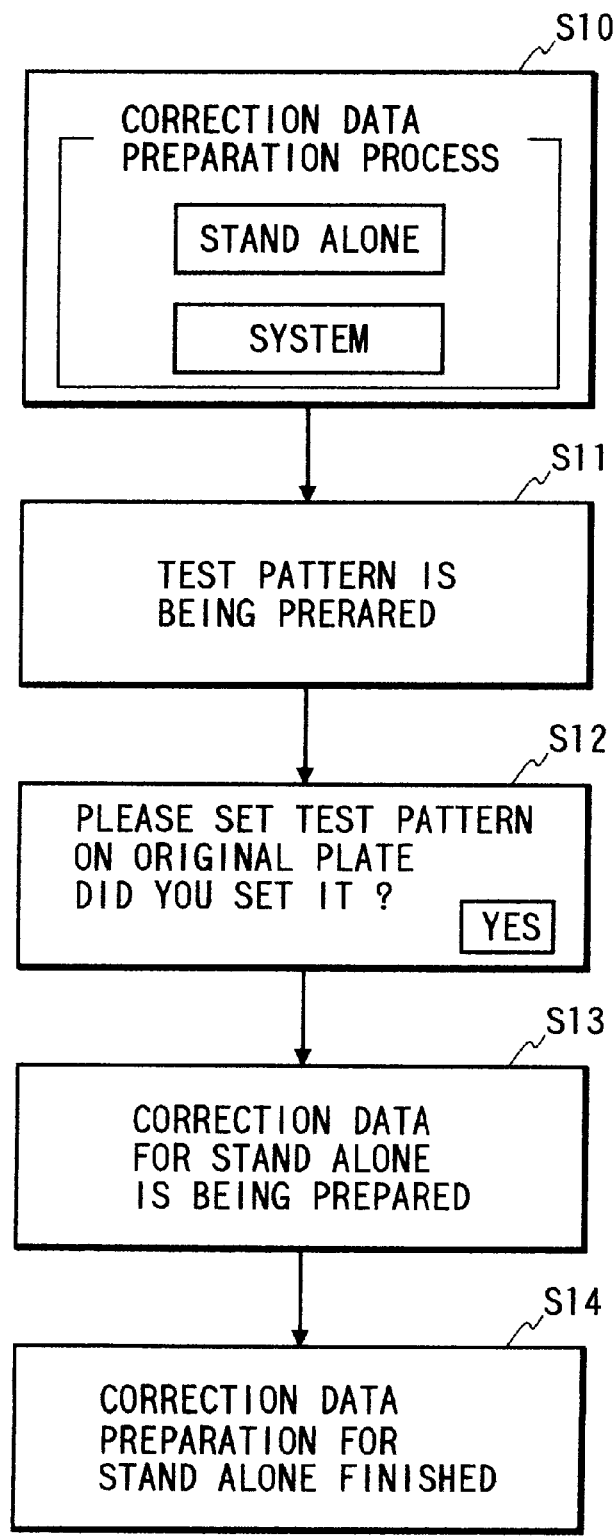
FIG. 12 is a view showing guidance displays for a sequence for preparing correction data for the stand-alone mode.

FIG. 12 shows the guidance display relating to the process for preparing the correction data for the stand-alone mode.

At first, an image for setting the process for preparing the correction data is displayed in response to an instruction of the user (S10).

When the process for preparing the correction data for the stand-alone mode is selected in the step S10, there is executed a test pattern output process (S1001) and there is given a display that the test pattern is in preparation (S11).

After the preparation of the test pattern in S11, a guidance is displayed to instruct the user to place the text pattern on the original table (S12).

When the user inputs that the test pattern has been placed on the original table in S12, there is executed a process for preparing the LUT for the stand-alone mode (S1002–S1004) and there is given a display that the preparation is in progress (S13).

When the stand-alone LUT calculated in S1004 is set in the LUT 25, there is displayed the completion of the preparation of the correction data for the stand-alone mode (S14).

In the following there will be explained, with reference to FIG. 13, the guidance display relating to the preparation of the system correction data for the color copying apparatus 2 utilizing the reader of the color copying apparatus 1, as an example of the correction data preparation process for the system (FIG. 11).

Figure 13:
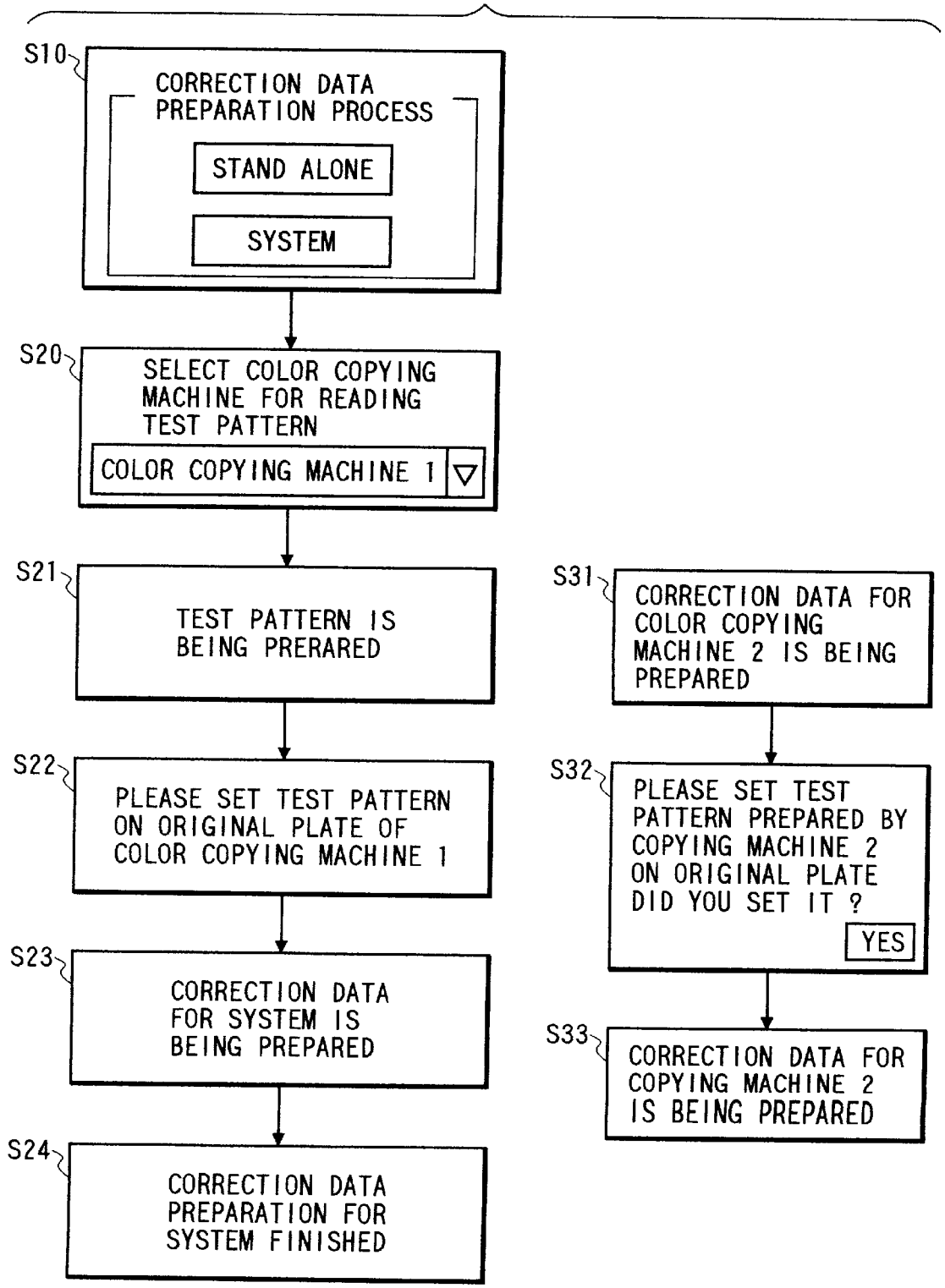
FIG. 13 is a view showing guidance displays for a sequence for preparing correction data for the system.

FIG. 13 shows the guidance display in case the preparation of the correction data for the system mode is executed at an independent timing for each color copying apparatus. However, the guidance display explained in the following is applicable also in case the preparation of the correction data is conducted in succession for the plural color copying apparatus as in the case of FIG. 11.

Referring to FIG. 13, the left-hand column shows the guidance display on the display unit of the color copying apparatus 2, while the right-hand column shows the guidance display on the display unit of the color copying apparatus 1. Also S21 and S31, S22 and S32 or S23 and S33 are substantially displayed simultaneously.

At first on the display unit of the color copying apparatus 2, there is displayed an image frame for setting the correction data preparation process, in response to an instruction by the user (S10).

When the correction data preparation process for the system mode is selected in S10, there is displayed an image frame (S20) for selecting the color copying apparatus for reading the test pattern.

In S20, there is displayed, as a default value, the color copying apparatus used for reading in the preceding correction data preparation for the system mode. It is however possible to select an arbitrary color copying apparatus for reading the test pattern, by a display of a group of the color copying apparatus on a pull-down menu and the selection of one within the group by the user.

When the correction data preparation process for the system mode is selected in the step S10, the color copying apparatus 2 executes bidirectional communication with other color copying apparatus 1, 3 connected to the printer driver 600, thereby confirming the current status (whether in operable state, whether a printing operation is in progress etc.) of such other copying apparatus. Then there are displayed, on a pull-down menu, the color copying apparatus which are in the operable state and are currently not in the printing operation.

In case the color copying apparatus which is displayed as the default value is not in a properly operable state, such situation is displayed to the user. Such display is given because it is important to use the same reader means for other color copying apparatus in the preparation of the correction data for the system mode.

When the color copying apparatus for reading the test pattern is selected in the step S20, the color copying apparatus 2 communicates with the color copying apparatus 1 in order to occupy the apparatus 1 in the course of the preparation process of the correction data for the system mode. Upon receiving the communication, the color copying apparatus 1 gives a display indicating that it is in the course of preparation of the correction data for the color copying apparatus 2 (S31) and does not accept the copying operation or the print instruction from the printer driver while it is occupied.

The color copying apparatus 1 executes the test pattern preparation process of the step S1105 and gives a display indicating that it is in the course of preparation of the test pattern (S21).

When the test pattern is prepared by the color copying apparatus 2, it gives a guidance for instructing the user to place the test pattern on the original table of the color copying apparatus 1. Also the color copying apparatus 1 gives a guidance for instructing the user to place the test pattern, prepared in the color copying apparatus 2, on the original table (S32).

When it is confirmed, in the step S32, that the test pattern has been placed on the original table of the color copying apparatus 2, there are executed steps S1106 to S1108. At first the color copying apparatus 2 reads the test pattern and transmits the obtained signals to the color copying apparatus 1 (S1106). Receiving the read data of the test pattern, the color copying apparatus 1 executes steps S1107 and S1108 for preparing the correction data for the system mode and setting the correction data in the system LUT 9002.

The color copying apparatus 2 gives a display indicating that it is in the course of preparation of the correction data of the system mode (S23), and the color copying apparatus 1 gives a display indicating that it is in the course of preparation of the correction data for the copying apparatus 2 (S33).

When the prepared correction data for the system mode are set in the system LUT 9002 in the step S1108, the color copying apparatus 2 gives a display that the preparation of the correction data for the system mode has been completed, and the color copying apparatus 1 is released from the occupied state. Then the date and time of preparation of the correction data for the system mode and the reader means used in the preparation are informed to the printer driver.

In the present embodiment, as explained in the foregoing, the user can easily execute the operations required for the preparation of the correction data, as the steps of such preparation are given to the user by the guidance displays.

In particular, the operations of the user in the correction data preparation for the system mode can be facilitated since the procedure is guided in combination of the color copying apparatus employed in the preparation of the test pattern and that employed for reading the test pattern.

FIG. 14 shows an example of the image that can be displayed on the host computer based on the information of the printer driver.

As explained in relation to FIG. 13, when the correction data for the system mode are generated, various information are informed to the printer driver. Consequently the host computer can summarize the status of preparation of the correction data in the system mode, in the plural color copying apparatus managed under the printer driver, and can display the status as shown in FIG. 14, in which each "YY MM DD" indicates the date of preparation.

In FIG. 14, there is collectively displayed a group of the color copying apparatus for which the correction data are prepared employing the same reading means. Consequently there may exist plural groups. In such case, there is displayed the list of a group designated by the user.

Such grouped display allows the user to confirm the group for which same color reproducibility is ensured.

In the foregoing embodiments, there has been explained the calibration of the LUT data relating to the gradation characteristics, but a similar configuration of the present invention is likewise applicable for example to the calibration of the correction data for the masking for color correction, thereby correcting the color of the output image from the respective apparatus. Thus the correction data to be calibrated according to the present invention are not limited to those relating to the gradation characteristics or the color characteristics explained in the foregoing, but also can be data for other purposes such as for gamma correction.

The embodiments of the present invention, as explained in the foregoing, employs common reader means for reading the test images in calibrating the image forming conditions of the plural image forming apparatus, thereby avoiding the influence of the difference in the image reading characteristics, resulting from the use of different reading means, and equalizing the image forming conditions at least for the data obtained not through the reader means.

As a result, in case of forming common images in the different image forming apparatus of the image forming system, there can be obtained substantially same gradation characteristics in such images.

The present invention is not limited to the embodiments explained in the foregoing but is subject to various modifications within the scope and spirit of the appended claims.

What is claimed is:

1. An image forming system including plural image forming apparatus, comprising:

test image forming means for forming a test image on a basis of predetermined data by utilizing each of said plural image forming apparatus;

reading means to be commonly used for reading the test image formed by said test image forming means, for each of said plural image forming apparatus; and calibration means for calibrating an image forming condition in each of said plural image forming apparatus, on a basis of the predetermined data and image data of the read test image corresponding to each of said plural image forming apparatus, wherein at least one of said plural image forming apparatus is a copying apparatus including, means for storing the image forming condition calibrated by said calibration means; and means for storing, separately from the image forming condition calibrated by said calibration means, an image forming condition calibrated after reading a test image with a scanner unit provided in said copying apparatus.

2. An image forming system according to claim 1, wherein each of said plural image forming apparatus is a copying apparatus, and said reading means includes an original reader provided in one of said plural copying apparatus.

3. An image forming system according to claim 1, wherein each of said plural image forming apparatus is a printer, and said reading means includes a scanner.

4. An image forming system according to any one of claims 1 to 3, wherein said image forming condition relates to correction of gradation characteristics of the image to be formed.

5. An image forming apparatus which performs image formation by using a calibrated image forming condition, comprising:

means for executing plural calibration functions;
   selection means for selecting a calibration function to be executed from among the plural calibration functions, on a basis of a user's instruction; and
   storage means for storing the plural image forming conditions respectively produced by the plural calibration functions, the plural calibration functions including,
      a first calibration function for calibrating the image forming condition, on a basis of data obtained by measuring a test pattern formed by said image forming apparatus with use of a measurement unit of said image forming apparatus, and
      a second calibration function for calibrating the image forming condition on a basis of data obtained by measuring the test pattern formed by said image forming apparatus with use of an external measurement device,
      wherein the first calibration function is a function to maintain image quality of said independent image forming apparatus, and
      the second calibration functions a function to match image quality of the plural image formation apparatuses to which image forming conditions are calibrated by said measurement device.

6. An apparatus according to claim 5, wherein the image forming condition is a gradation correction condition.

7. An apparatus according to claim 5, further comprising a reader unit for reading an original image,
   wherein said measurement unit used in said first calibration function is said reader unit.

8. An image forming method which includes plural calibration functions to calibrate an image forming condition used in a case of performing image formation by an image forming apparatus, said method comprising:

a holding step of holding the plural image forming conditions respectively produced by the plural calibration functions, the plural calibration functions including,
      a first calibration function for calibrating the image forming condition, on a basis of data obtained by measuring a test pattern formed by the image forming apparatus with use of a measurement unit of the image forming apparatus, and
      a second calibration function for calibrating the image forming condition, on a basis of data obtained by measuring the test pattern formed by the image forming apparatus with use of an external measurement device,
      wherein the first calibration function is a function to maintain image quality of the independent image forming apparatus, and
      the second calibration function is a function to match image quality of the plural image formation apparatuses to which image forming conditions are calibrated by the measurement device.

9. An image forming method which calibrates an image forming condition used in a case of performing image formation by an image forming apparatus connected through a network to an apparatus having an image reading unit, said method comprising the steps of:

inputting an instruction to execute calibration processing for calibrating the image forming condition, on a basis of data obtained by reading a test pattern formed by the image forming apparatus with the image reading unit;
   communicating with the apparatus having the image reading unit, and occupying the apparatus having the image reading unit so as not to receive through the network an instruction from other apparatus; and
   communicating with the apparatus having the image reading unit and releasing occupation of the apparatus having the image reading unit, according to an execution condition of the calibration processing.

10. A method according to claim 9, wherein the apparatus having the image reading unit notifies that the calibration processing is being executed, during the occupation of the apparatus having the image reading unit.

11. A method according to claim 9, wherein the apparatus having the image reading unit is a color copying machine, and
   the calibration processing is processing to match a tint of an output image from the color copying machine with a tint of an output image from the image formation apparatus.

12. A method according to claim 9, wherein the image forming condition is a gradation correction condition.

* * * * *

UNITED STATES PATENT AND TRADEMARK OFFICE
CERTIFICATE OF CORRECTION

PATENT NO.    : 6,172,771 B1
DATED         : January 9, 2001
INVENTOR(S)   : Yuichi Ikeda et al.

It is certified that error appears in the above-identified patent and that said Letters Patent is hereby corrected as shown below:

Column 1,
Line 11, "the" should be deleted;
Line 20, "an" (second occurrence) should read -- a --;
Line 21, "the different" should read -- different --; and
Line 22, "same" should read -- the same --.

Column 3,
Line 3, "composed for example" should read -- composed, for example, --.

Column 4,
Line 39, "signal" should read -- signals --.

Column 5,
Line 63, "Then" should read -- Then, --; and "between" should read -- between the --.

Column 7,
Line 9, "first" should read -- first, --; and
Line 53, "same" should read -- the same --.

Column 8,
Line 53, "first" should read -- first, --.

Column 9,
Line 7, "Then" should read -- Then, --; and
Line 41, "first" should read -- first, --.

UNITED STATES PATENT AND TRADEMARK OFFICE
CERTIFICATE OF CORRECTION

PATENT NO. : 6,172,771 B1
DATED : January 9, 2001
INVENTOR(S) : Yuichi Ikeda et al.

It is certified that error appears in the above-identified patent and that said Letters Patent is hereby corrected as shown below:

<u>Column 10,</u>
Lines 8 and 16, "Consequently" should read -- Consequently, --;
Line 20, "same" should read -- the same --;
Line 24, "applicable for example" should read -- applicable, for example --;
Line 33, "employs" should read -- employ --; and
Line 42, "same" should read -- the same --.

<u>Column 11,</u>
Line 39, "functions" should read -- function is --.

Signed and Sealed this

Fifth Day of August, 2003

JAMES E. ROGAN
*Director of the United States Patent and Trademark Office*